(12) United States Patent
Di et al.

(10) Patent No.: US 7,216,066 B2
(45) Date of Patent: *May 8, 2007

(54) METHOD AND APPARATUS FOR GENERATING AND MANAGING A LANGUAGE MODEL DATA STRUCTURE

(75) Inventors: Shuo Di, Nashua, NH (US); Kai-Fu Lee, Woodinville, WA (US); Lee-Feng Chien, Beijing (CN); Zheng Chen, Beijing (CN); Jianfeng Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/276,292

(22) Filed: Feb. 22, 2006

(65) Prior Publication Data

US 2006/0184341 A1 Aug. 17, 2006

Related U.S. Application Data

(63) Continuation of application No. 09/608,526, filed on Jun. 30, 2000, now Pat. No. 7,020,587.

(51) Int. Cl.
G06F 7/60 (2006.01)
G06F 17/27 (2006.01)
G10L 15/00 (2006.01)
G10L 19/14 (2006.01)

(52) U.S. Cl. .............. 703/2; 704/9; 704/231; 704/235; 704/251; 704/256

(58) Field of Classification Search .............. 703/2; 704/243, 9, 231, 235, 251, 256
See application file for complete search history.

(56) References Cited

U.S. PATENT DOCUMENTS

| | | | |
|---|---|---|---|
| 4,819,271 A | 4/1989 | Bahl et al. | |
| 5,477,451 A | 12/1995 | Brown et al. | |
| 5,696,962 A | 12/1997 | Kupiec | |
| 5,768,603 A | 6/1998 | Brown et al. | |
| 5,845,306 A | 12/1998 | Schabes et al. | |
| 5,862,519 A | 1/1999 | Sharma et al. | |
| 6,009,390 A | 12/1999 | Gupta et al. | |
| 6,141,641 A * | 10/2000 | Hwang et al. | 704/243 |
| 6,493,637 B1 | 12/2002 | Steeg et al. | |
| 6,556,969 B1 | 4/2003 | Assaleh et al. | |
| 6,671,668 B2 | 12/2003 | Harris | |
| 6,904,402 B1 | 6/2005 | Wang et al. | |

OTHER PUBLICATIONS

Wu et al., "Integrating Syllable Boundary Information into Speech Recognition" 1997 IEEE pp. 987-990.*

Lee-K.F., "Large-Vocabulary Speaker-Independent Continuous Speech Recognition: The SPHINX System", 1988. ProQuest Dissertations. abstract, pp. 1-2.*

(Continued)

Primary Examiner—Anthony Knight
Assistant Examiner—Tom Stevens
(74) Attorney, Agent, or Firm—Lee & Hayes, PLLC

(57) ABSTRACT

A method is presented comprising assigning each of a plurality of segments comprising a received corpus to a node in a data structure denoting dependencies between nodes, and calculating a transitional probability between each of the nodes in the data structure.

20 Claims, 7 Drawing Sheets

OTHER PUBLICATIONS

Huang et al., "Improved Acoustic Modeling with the SPHINX Speech Recognition System" 1991, IEEE, pp. 345-348.*

Chien, et al., "A Best-First Language Processing Model Integrating the Unification Grammar and Markov Language Model for Speech Recognition Applications", search abstract, paper available in Speech and Audio Processing, IEEE Transactions, vol. 1, No. 2, Apr. 1993, pp. 221-240.

Hon, et al., "Towards Large Vocabulary Mandarin Chinese Speech Recognition", 1994, IEEE pp. 545-548.

Kukich, "Techniques for Automatically Correcting Words in Text", ACM Computing Surveys, Dec. 1, 1992, vol. 24, No. 4, pp. 378-439.

Silverstein, et al., "Scaleable Techniques for Mining Casual Structures", 1998, VLBD Conference, NY, pp. 594-605.

* cited by examiner

*Fig. 6*
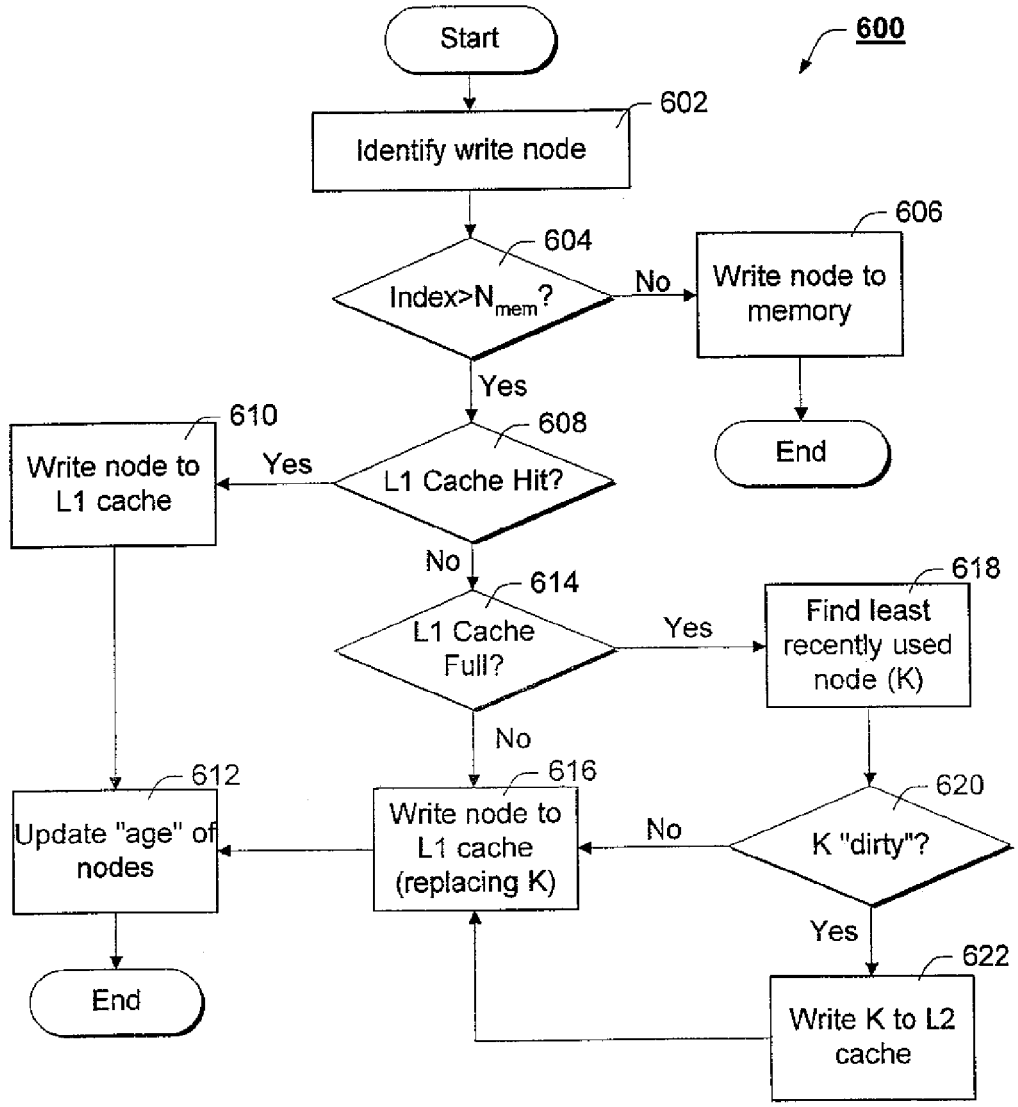
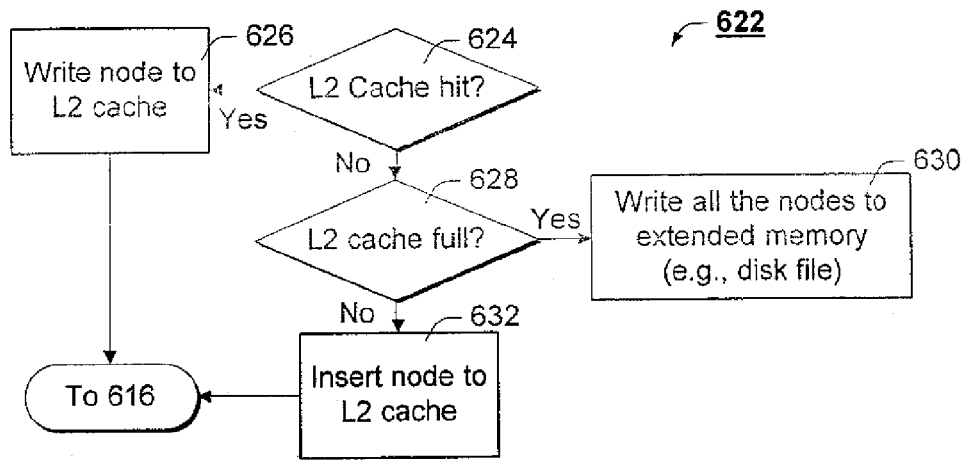

METHOD AND APPARATUS FOR GENERATING AND MANAGING A LANGUAGE MODEL DATA STRUCTURE

RELATED APPLICATIONS

This application claims priority under 35 U.S.C. §120 as a continuation of U.S. patent application Ser. No. 09/608,526, filed Jun. 30, 2000, now U.S. Pat. No. 7,020,587 the entire disclosure of which is hereby incorporated by reference in its entirety.

TECHNICAL FIELD

This invention generally relates to language modeling and, more particularly, to a method and apparatus for generating and managing a language model data structure.

BACKGROUND

Recent advances in computing power and related technology have fostered the development of a new generation of powerful software applications including web-browsers, word processing and speech recognition applications. The latest generation of web-browsers, for example, anticipate a uniform resource locator (URL) address entry after a few of the initial characters of the domain name halve been entered. Word processors offer improved spelling and grammar checking capabilities, word prediction, and language conversion. Newer speech recognition applications similarly offer a wide variety of features with impressive recognition and prediction accuracy rates. In order to be useful to an end-user, these features must execute in substantially real-time. To provide this performance, many applications rely on a tree-like data structure to build a simple language model.

Simplistically, a language model measures the likelihood of any given sentence. That is, a language model can take any sequence of items (words, characters, letters, etc.) and estimate the probability of the sequence. A common approach to building a prior art language model is to utilize a prefix tree-like data structure to build an N-gram language model from a known training set of text.

The use of a prefix tree data structure (a.k.a. a suffix tree, or a PAT tree) enables a higher level application to quickly traverse the language model, providing the substantially real-time performance characteristics described above. Simplistically, the N-gram language model counts the number of occurrences of a particular item (word, character, etc.) in a string (of size N) throughout a text. The counts are used to calculate the probability of the use of the item stings. Traditionally, a tri-gram (N-gram where N=3) approach involves the following steps:

(a) characters (C) are segmented into words (W) using a pre-defined lexicon, wherein each W is mapped in the tree to one or more C's;

(b) predict the probability of a sequence of words ($W_1$, $W_2$, ... $W_M$) from the previous two words:

$$P(W_1, W_2, W_3, \ldots W_M) \approx \Pi P(W_{i-1}, W_{i-2}) \quad (1)$$

The N-gram language model is limited in a number of respects. First, the counting process utilized in constructing the prefix tree is very time consuming. Thus, only small N-gram models (typically bi-gram, or tri-gram) can practically be achieved. Second, as the string size (N) of the N-gram language model increases, the memory required to store the prefix tree increases by $2^N$. Thus, the memory required to store the N-gram language model, and the access time required to utilize a large N-gram language model is prohibitively large for N-grams larger than three (i.e., a ti-gram).

As a consequence of these computational and architectural limitations, prior art implementations of N-gram language models tend to be very rigid. That is, prior art N-gram language models tend to use a standard (small) lexicon, a simplistic segmentation algorithm, and will typically only rely on the previous two words to predict the current word (in a tri-gram model).

A small lexicon limits the ability of the model to identify words to those contained in the lexicon. If a word is not in the lexicon, it does not exist as far as the model is concerned. A simplistic segmentation algorithm typically errors in favor of larger words over smaller words. Thus, the model is unable to accurately predict smaller words contained within larger lexiconically acceptable strings. Moreover, the lexicon and segmentation algorithm that converts the characters to words may be error-prone (e.g., it is well accepted that all known segmentation algorithms make errors), and that such errors are then propagated through the model thereby limiting its accuracy and predictive attributes.

Finally, limiting the model to at most the previous two words for context (in a tri-gram language model) is also limiting in that a greater context might be required to accurately predict the likelihood of a word. The limitations on these three aspects of the language model often result in poor predictive qualities of the language model.

Thus, an improved method and apparatus for generating and managing a language model data structure is required, unencumbered by the deficiencies and limitations commonly associated with prior art language modeling techniques. Just such a solution is provided below.

SUMMARY

This invention concerns a method and apparatus for generating and managing a language model data structure. According to a first aspect of the invention, a method is presented comprising assigning each of a plurality of segments comprising a received corpus to a node in a data structure denoting dependencies between nodes, and calculating a transitional probability between each of the nodes in the data structure.

According to a second aspect of the invention, a data structure is presented comprising a root node and a plurality of subordinate nodes, ultimately linked to the root node, cumulatively comprising one or more sub-trees, wherein each subordinate node of a sub-tree includes a measure of a Markov transition probability between the node and another node. In addition to the Markov transition probability, each node of a binary tree includes a compare bit, and an indication of which item of the corpus the node is associated. It will be appreciated by those skilled in the art that utilizing binary sub-trees greatly reduces the overall complexity of the language model while utilize a dynamically allocated context, thereby improving overall performance of the language model when compared to the prior art.

According to one implementation, the data structure is generated and maintained by one or more computer systems. Accordingly, a computer system is presented to manage a language model data structure having a plurality of nodes, the computer system comprising a controller and a memory subsystem, coupled with and responsive to the controller. The memory subsystem is comprised of a first level cache, a second level cache and an extended memory (e.g., one or more disk files). The first level cache stores a first subset of the plurality of nodes, which are often accessed. The second level cache is utilized as a node write buffer to the memory subsystem. In this regard, the second level cache stores two or more "write node" commands, and the controller combines the two or more node write commands into a single, composite node write command. The extended memory is used to store one or more files which contain language model data structure nodes that are not often used and are not, therefore, retained in the first level cache.

BRIEF DESCRIPTION OF THE DRAWINGS

The same reference numbers are used throughout the figures to reference like components and features.

FIG. 6 is a flow chart of an example method for writing a node to the DOMM tree;

DETAILED DESCRIPTION

This invention concerns a method and apparatus for generating and managing a language model data structure. According to one aspect of the invention, the language model data structure is developed without the limitations of a pre-defined lexicon or a segmentation algorithm. Rather, the invention described herein calculates the Markov transition probabilities between individual characters is developing a language model. Moreover, the present invention dynamically modifies the context utilized in calculating the probability of an item, and is not limited to the prior two words (like a tri-gram language model). Insofar as the context is dynamically generated, and the language model relies on the Markov transition probabilities between individual characters, the innovative language model described herein is referred to as a Dynamic Order Markov Model (DOMM).

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices. It is noted, however, that modification to the implementations and the methods may be made without deviating from the spirit and scope of the claimed invention.

Example Computer System

Figure 1:
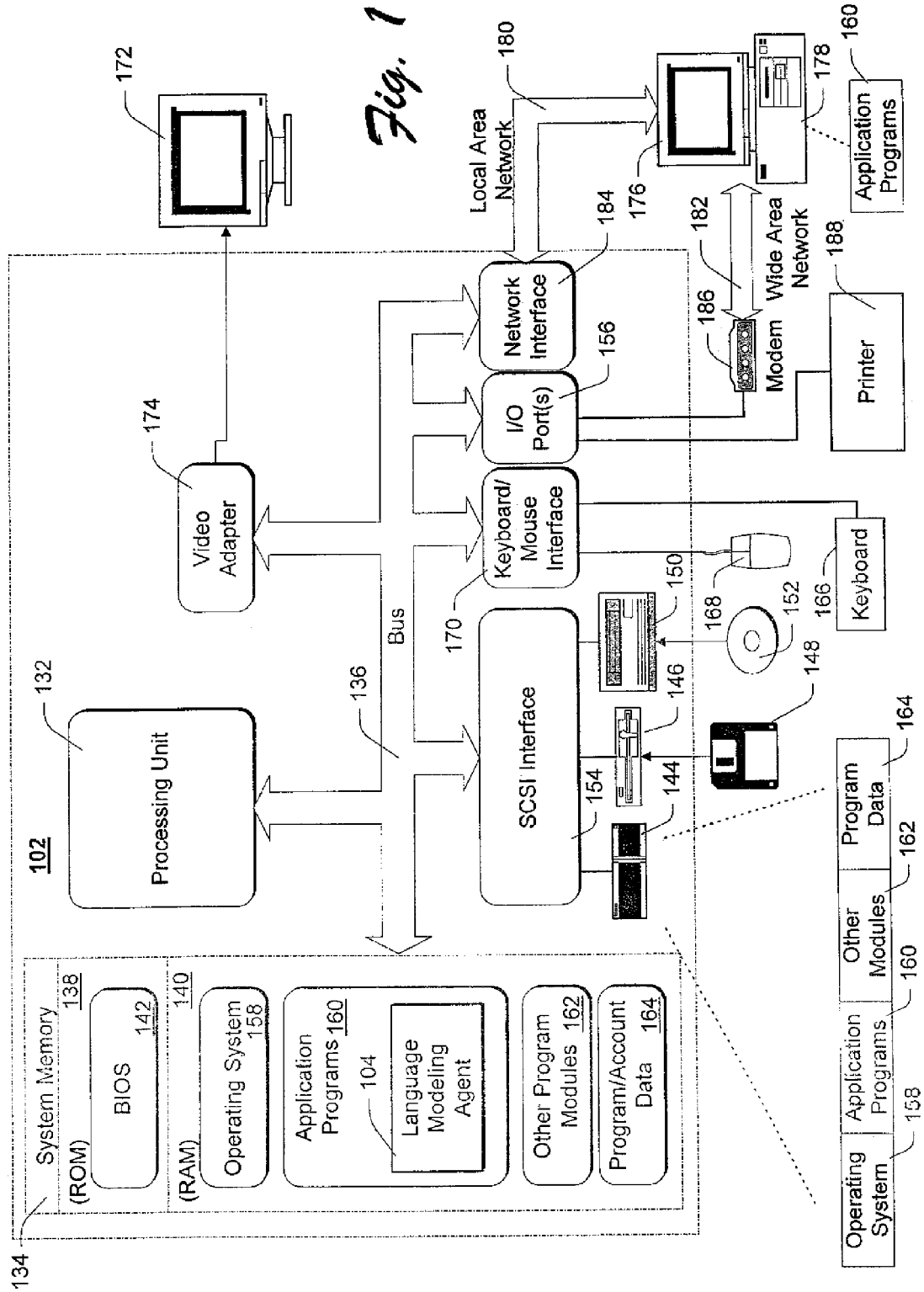
FIG. 1 is a block diagram of a computer system incorporating the teachings of the present invention.

FIG. 1 illustrates an example computer system 102 including an innovative language modeling agent 104, which develops and maintains a language model data structure using Markov transition probabilities between individual characters of a corpus. It should be appreciated that although depicted as a separate, stand alone application in FIG. 1, language modeling agent 104 may well be implemented as a function of an application, e.g., word processor, web browser, speech recognition system, etc. It will be evident, from the discussion to follow, that computer 102 is intended to represent any of a class of general or special purpose computing platforms which, when endowed with the innovative language modeling agent (LMA) 104, implement the teachings of the present invention in accordance with the first example implementation introduced above. It is to be appreciated that although the language modeling agent is depicted herein as a software application, computer system 102 may alternatively support a hardware implementation of LMA 104 as well. In this regard, but for the description of LMA 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative LMA 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

Figure 2:
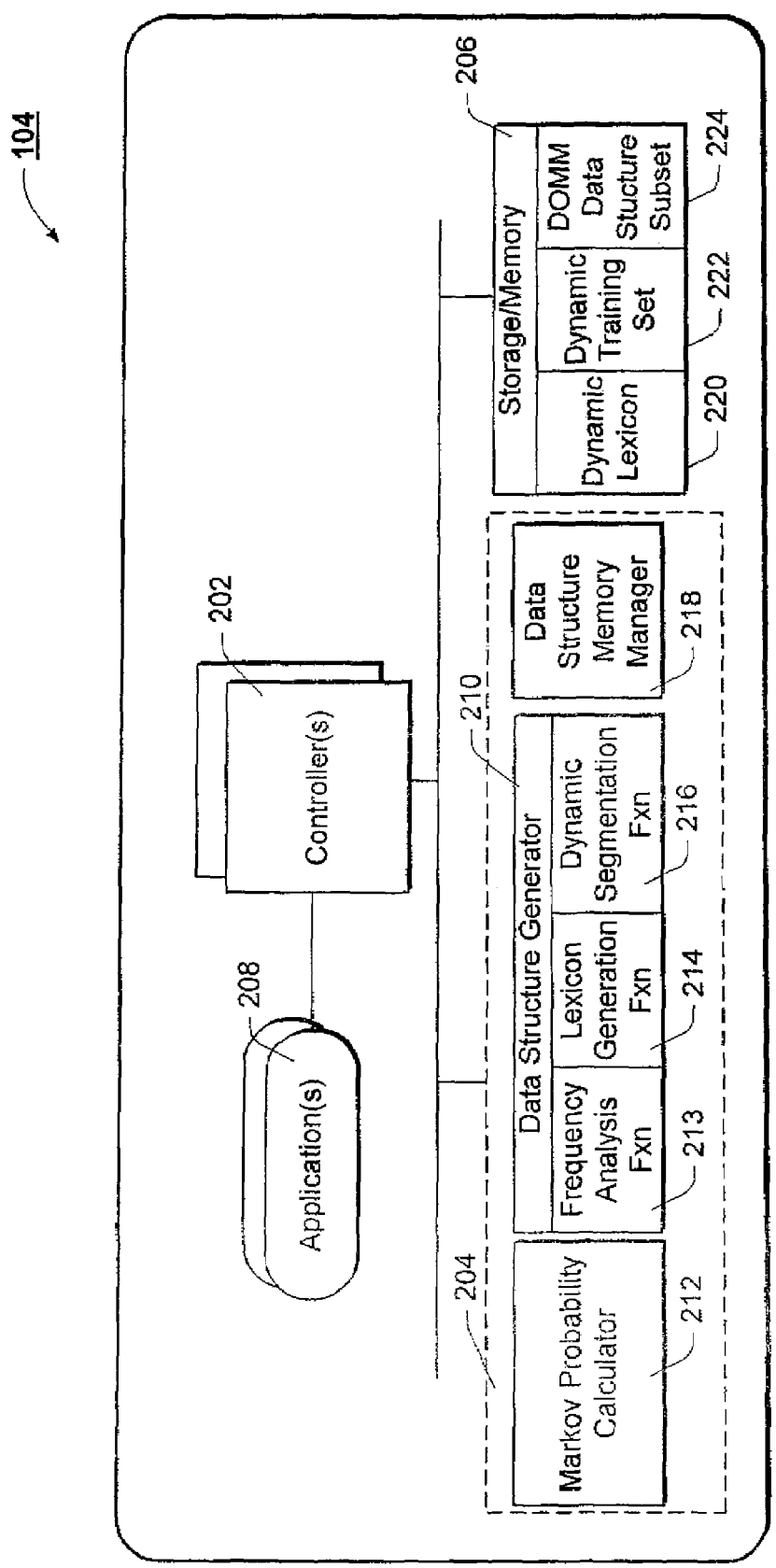
FIG. 2 is a block diagram of an example modeling agent which builds and manages an innovative language model data structure, according to one implementation of the present invention.

As shown, the logical connections depicted in FIG. 2 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a input/output (I/O) interface 156. In addition to network connectivity, I/O interface 156 also supports one or more printers 188. In a networked environment, program modules depicted relative to the personal computer 102, or portions thereof may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Language Modeling Agent

FIG. 2 illustrates a block diagram of an example language modeling agent (LMA) 104, incorporating the teachings of the present invention. As shown, language modeling agent 104 is comprised of one or more controllers 202, innovative analysis engine 204, storage/memory device(s) 206 and, optionally, one or more additional applications (e.g., graphical user interface, prediction application, verification application, estimation application, etc.) 208, each communicatively coupled as shown. It will be appreciated that although depicted in FIG. 2 as a number of disparate blocks, one or more of the functional elements of the LMA 104 may well be combined. In this regard, modeling agents of greater or lesser complexity which nonetheless utilize Markov transition probabilities to statistically model a language may well be employed without deviating from the spirit and scope of the present invention.

As alluded to above, although depicted as a separate functional element, LMA 104 may well be implemented as a function of a higher level application, e.g., a word processor web browser, speech recognition system, or a language conversion system. In this regard, controller(s) 202 of LMA 104 are responsive to one or more instructional commands from the dominant application to selectively invoke the features of LMA 104. Alternatively, LMA 104 may well be implemented as a stand-alone language modeling tool, providing a user with a user interface (208) to selectively implement the features to be discussed below.

In either case, controller(s) 202 of LMA 104 selectively invoke one or more of the functions of analysis engine 204 to generate and manage a language model data structure 224. Thus, except as configured to effect the teachings of the present invention, controller 202 is intended to represent any of a number of alternate control systems known in the art including, but not limited to, a microprocessor, a programmable logic array (PLA), a micro-machine, an application specific integrated circuit (ASIC) and the like. In an alternate implementation, controller 202 is intended to represent a series of executable instructions to implement the logic described above.

As shown, the innovative analysis engine 204 is comprised a Markov probability calculator 212, a data structure generator 210 including a frequency calculation function 213, a lexicon generation function 214 and a dynamic segmention function 216, and a data structure memory manager 218. Upon receiving an external indication, controller 202 selectively invokes an instance of the analysis engine 204 to develop, modify or utilize a language model. Unlike prior art techniques for generating a language model, analysis engine 204 develops a language model data structure fundamentally based on the Markov transition probabilities between individual items of a textual corpus (e.g., one or more sets of text). Moreover, as will be shown, analysis engine 204 utilizes as much data (referred to as "context" or "order" as is available to calculate the probability of an item string. In this regard, the language model of the present invention is aptly referred to as a Dynamic Order Markov Model (DOMM).

When invoked by controller 202 to establish a DOMM data structure, analysis engine 204 selectively invokes the data structure generator 210. In response, data structure generator 210 establishes a tree-like data structure to be populated with nodes denoting inter-node dependencies. As described above, the tree-like data structure is referred to herein as a DOMM data structure, or DOMM tree. Controller 202 receives the textual corpus and stores at least a subset of the textual corpus in memory 206 as a dynamic training set 222 from which the language model is to be developed. It will be appreciated that, in alternate embodiments, a predetermined training set may also be used.

Once the dynamic training set is received, at least a subset of the training set 222 is retrieved by frequency calculation function 213 for analysis. Frequency calculation function 213 identifies a frequency of occurrence for each item (character, letter, number, word, etc.) in the training set subset from which the Markov transition probability is calculated. Based on inter-node dependencies, data structure generator 210 assigns each item to an appropriate node of the DOMM tree, with an indication of the frequency value ($C_i$) and a compare bit ($b_i$).

The Markov probability calculator 212 calculates the probability of an item (character, letter, number, etc.) from a context (j) of associated items. More specifically, according to the teachings of the present invention, the Markov probability of a particular item ($C_i$) is dependent on as many previous characters as data "allows", in other words:

$$P(C_1, C_2, C_3, \ldots, C_N) \approx \Pi P(C_i | C_{i-1}, C_{i-2}, C_{i-3}, \ldots, C_j) \quad (2)$$

The number of characters employed as context (j) by Markov probability calculator 212 is a "dynamic" quantity that is different for each sequence of is characters $C_i$, $C_{i-1}$, $C_{i-2}$, $C_{i-3}$, etc. According to one implementation, the number of characters relied upon for context (j) by Markov probability calculator 212 is dependent, at least in part, on a frequency value for each of the characters, i.e., the rate at which they appear throughout the corpus. More specifically, if in identifying the items of the corpus Markov probability calculator 212 does not identify at least a minimum occurrence frequency for a particular item, it may be "pruned" (i.e., removed) from the tree as being statistically irrelevant. According to one embodiment the minimum frequency threshold is three (3).

As alluded to above, analysis engine 204 does not rely on a fixed lexicon or a simple segmentation algorithm (both of which tend to be error prone). Accordingly, analysis engine 204 selectively invokes a dynamic segmentation function 216 to segment items (characters or letters, for example) into strings (e.g., words). More precisely, segmentation function 216 segments the training set 222 into subsets (chunks) and calculates a cohesion score (i.e., a measure of the similarity between items within the subset). The segmentation and cohesion calculation is iteratively performed by segmentation function 216 until the cohesion score for each subset reaches a predetermined threshold.

The lexicon generation function 214 is invoked to dynamically generate and maintain a lexicon 220 in memory 206. According to one implementation, lexicon generation function 214 analyzes the segmentation results and generates a lexicon from item strings with a Markov transition probability that exceeds a threshold. In this regard, lexicon generation function 214 develops a dynamic lexicon 220 from item strings which exceed a pre-determined Markov transition probability taken from one or more language models developed by analysis engine 204. Accordingly, unlike prior art language models which rely on a known, fixed lexicon that is prone to error, analysis engine 204 dynamically generates a lexicon of statistically significant, statistically accurate item strings from one or more language models developed over a period of time. According to one embodiment, the lexicon 220 comprises a "virtual corpus" that Markov probability calculator 212 relies upon (in addition to the dynamic training set) in developing subsequent language models.

When invoked to modify or utilize the DOMM language model data structure, analysis engine 204 selectively invokes an instance of data structure memory manager 218. According to one aspect of the invention, data structure memory manager 218 utilizes system memory as well as extended memory to maintain the DOMM data structure. More specifically, as will be described in greater detail below with reference to FIGS. 6 and 7, data structure memory manager 218 employs a WriteNode function and a ReadNode function (not shown) to maintain a subset of the most recently used nodes of the DOMM data structure in a first level cache 224 of a system memory 206, while relegating least recently used nodes to extended memory (e.g., disk files in hard drive 144, or some remote drive), to provide for improved performance characteristics. In addition, a second level cache of system memory 206 is used to aggregate write commands until a predetermined threshold has been met, at which point data structure memory manager make one aggregate WriteNode command to an appropriate location in memory. Although depicted as a separate functional element, those skilled in the art will appreciate that data structure memory manager 218 may well be combined as a functional element of controller(s) 202 without deviating from the spirit and scope of the present invention.

Example Data Structure—Dynamic Order Markov Model (DOMM) Tree

Figure 3:
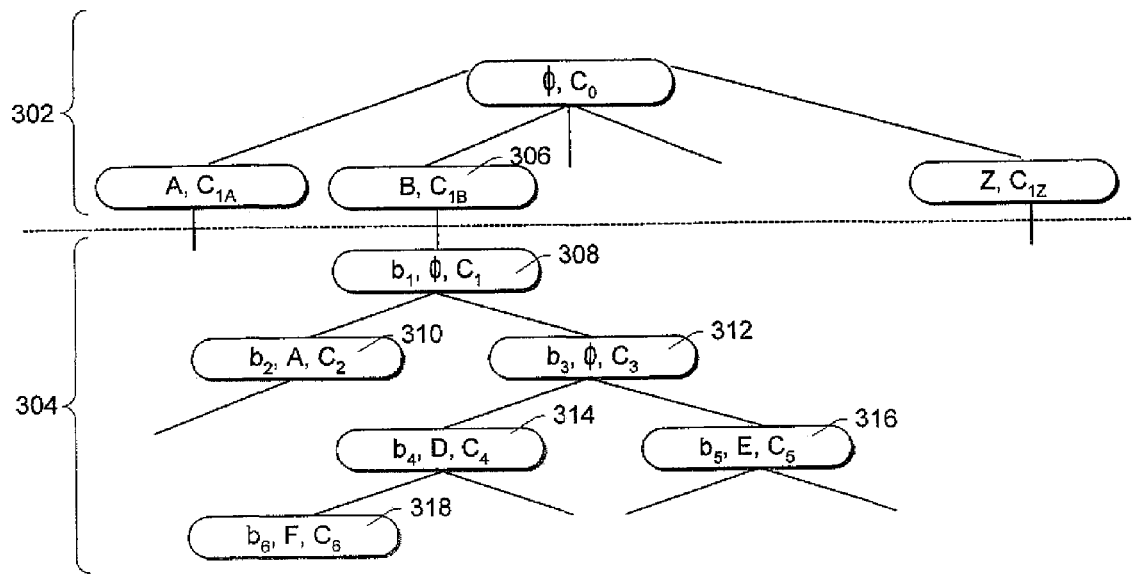
FIG. 3 is a graphical representation of an example dynamic order markov model (DOMM)

FIG. 3 graphically represents a conceptual illustration of an example Dynamic Order Markov Model tree-like data structure 300, according to the teachings of the present invention. To conceptually illustrate how a DOMM tree data structure 300 is configured, FIG. 3 presents an example DOMM data structure 300 for a language model developed from the English alphabet, i.e., A, B, C, . . . Z. As shown the DOMM tree 300 is comprised of one or more root nodes 302 and one or more subordinate nodes 304, each associated with an item (character, letter, number, word, etc.) of a textual corpus, logically coupled to denote dependencies between nodes. According to one implementation of the present invention, root nodes 302 are comprised of an item and a frequency value (e.g., a count of how many times the item occurs in the corpus). At some level below the root node level 302, the subordinate nodes are arranged in binary sub-trees, wherein each node includes a compare bit ($b_i$), an item with which the node is associated (A, B, . . . ), and a frequency value ($C_N$) for the item.

Thus, beginning with the root node associated with the item B 306, a binary sub-tree is comprised of subordinate nodes 308–318 denoting the relationships between nodes and the frequency with which they occur. Given this conceptual example, it should be appreciated that starting at a root node, e.g., 306, the Complexity of a search of the DOMM tree approximates log(N), where N is the total number of nodes to be searched.

As alluded to above, the size of the DOMM tree 300 may exceed the space available in the memory device 206 of LMA 104 and/or the main memory 140 of computer system 102. Accordingly, data structure memory manager 218 facilitates storage of a DOMM tree data structure 300 across main memory (e.g., 140 and/or 206) into an extended memory space, e.g., disk files on a mass storage device such as hard drive 144 of computer system 102. A logical and architectural model of the DOMM data structure 300 traversing such memory boundaries is provided with reference to FIG. 4.

Figure 4:
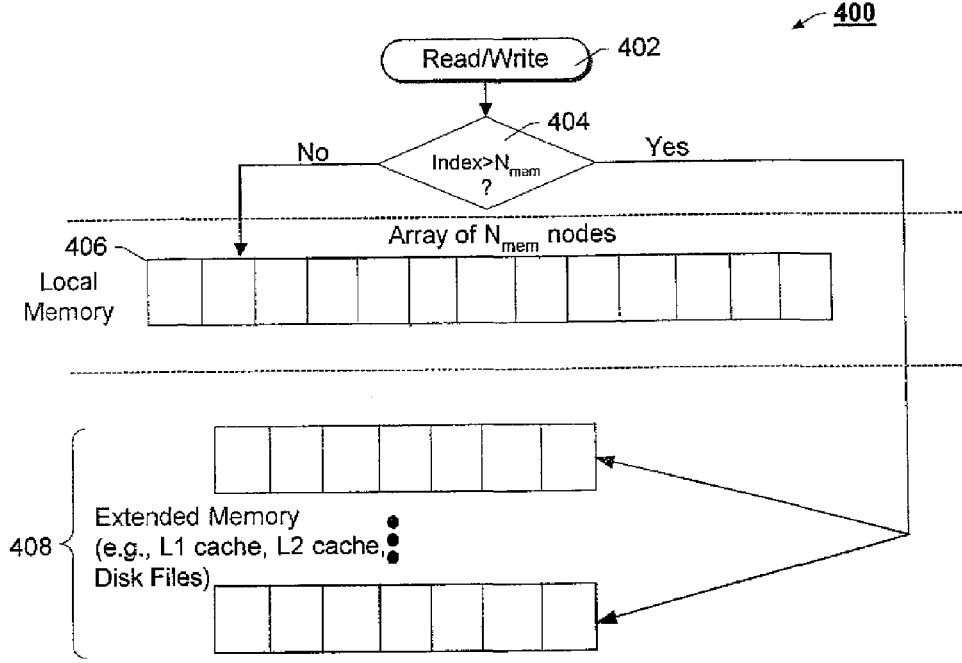
FIG. 4 is a graphical illustration of an example memory model for storing a DOMM tree.

FIG. 4 graphically represents a logical and architectural model of the operation of the data structure memory manager 218 according to one implementation of the present invention. As shown, the data structure memory manager 218 manages a virtual memory space comprised of main memory 406 (e.g., system memory 140 and/or 206) and extended memory 408 (e.g., disk files on hard drive 144) in order to store DOMM tree 300. According to one implementation, data structure memory manager 218 maintains a pointer (Index) to memory locations where each node of DOMM tree 300 is maintained. Thus, whenever an access (read or write) to a node of DOMM is made (block 402), data structure memory manger 218 determines whether the node is stored in main memory 406 or extended memory 408 based, at least in part, on the Index value for the particular node (block 408).

As shown, data structure memory manager 218 maintains an array of $N_{mem}$ nodes in main memory 406. Once the number of nodes exceeds the size of main memory 406 ($N_{mem}$), data structure memory manager 218 identifies the most active nodes and maintains such nodes in main memory 406, while the remaining (less active) nodes are maintained at extended memory 408. According to one implementation, data structure memory manager 218 maintains an "age" value for each DOMM node in memory which denotes a count of the number of accesses that the DOMM tree has been accessed without hitting the node. The $N_{mem}$ nodes with the lowest age are maintained in main memory 406, while any remaining nodes are maintained in extended memory 408.

Operation and Implementation

Having introduced the functional and conceptual elements of the present invention with reference to FIGS. 1–4, the operation of the innovative language modeling agent 104 will now be described with reference to FIGS. 5–8.

Building DOMM Tree Data Structure

Figure 5:
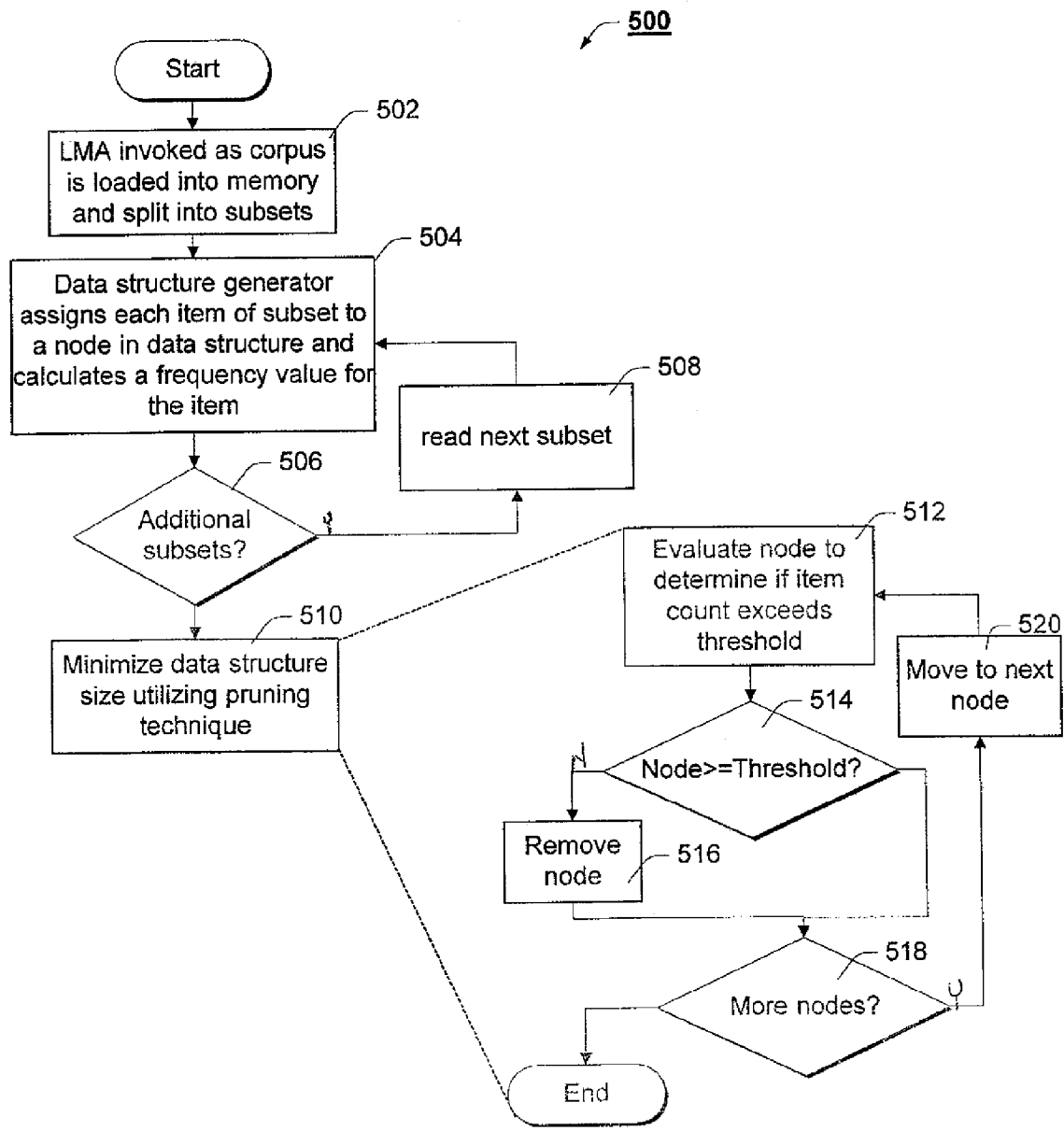
FIG. 5 is a flow chart of an example method for building a DOMM tree.

FIG. 5 is a flow chart of an example method for building a language model data structure, according to the teachings of the present invention. As alluded to above, language modeling agent 104 may be invoked directly by a user or a higher-level application. In response, controller 202 of LM 104 selectively invokes an instance of analysis engine 204, and a textual corpus (e.g., one or more documents) is loaded into memory 206 as a dynamic training set 222 and split into subsets (e.g., sentences, lines, etc.), block 502. In response, data structure generator 210 assigns each item of the subset to a node in data structure and calculates a frequency value for the item, block 504. According to one implementation, once data structure generator has loaded the subset into the data structure, frequency calculation function 213 is invoked to identify the occurrence frequency of each item within the training set subset.

In block 506, data structure generator determines whether additional subsets of the training set remain and, if so, the next subset is read in block 508 and the process continues with block 504. In alternate implementation, data structure generator 210 completely loads the data structure, a subset at a time. Once the data structure is completely loaded with the items of the training set, data structure generator 210 invokes frequency calculation function 213 to identify the frequency value of the items.

If, in block 506 data structure generator 210 has completely loaded the data structure 300 with items of the training set 222, data structure generator 210 may optionally prune the data structure, block 510. A number of mechanisms may be employed to prune the resultant data structure 300.

According to one implementation, illustrated in FIG. 5, data structure generator 210 evaluates each node of the resultant data structure, beginning with the most subordinate nodes, to determine if the item is statistically relevant to the language model, block 512. In one embodiment, the relevance threshold is set to three (3). Accordingly, in block 514, data structure generator 210 determines whether the frequency of the node ($F_{node}$) exceeds the threshold value. If not, the node is removed from the data structure, block 516. If the frequency does meet or exceed the threshold (514), or once a prior block has been removed (516), data structure generator 210 determines whether additional nodes remain for pruning analysis, block 518. If so, data structure generator 210 moves to the next node, block 520, and the process continues with block 512. As shown, the iterative pruning process 510 continues until all of the nodes have been analyzed.

Example DOMM Data Structure Memory Management

As alluded to above, with respect to FIG. 4, data structure memory manager 218 manages the DOMM data structure across main memory 406 and extended memory 408. DOMM nodes are created or modified with a WriteNode command, while DOMM nodes are read with a ReadNode command. In this regard, data structure memory manager 218 manages the writing to and reading from main memory 406 and extended memory 408 using the WriteNode and ReadNode commands. Example implementations of writing to and reading from the DOMM data structure will thus be presented with reference to FIGS. 6 and 7.

FIG. 6 is a flow chart of an example method for writing a node of the language model data structure to memory. As shown, the method begins with block 602, wherein data structure memory manager 218 receives a writenode command. In block 604, data structure memory manager determines whether the requested node is located in main memory 406 or extended memory 408. More specifically, data structure memory manager 218 identifies the pointer (Index) associated with the requested node, and determines whether it points to a memory location outside of main memory 406. If the Index pointer is pointing to a location within main memory 406 (Index<=$N_{mem}$), data structure memory manager 218 executes the WriteNode command, writing to the identified node, block 606, and the process ends.

If, in block 604, the Index pointer is pointing to extended memory, a further determination is made of whether the Index pointer points to a location within a level one (L1) cache (i.e., a L1 cache hit), block 608. If so, data structure memory manager writes the node to L1 cache, block 610. As alluded to above, data structure memory manager 218 maintains a record of activity for each of the nodes of the data structure. According to one implementation, an "age" is maintained denoting the number of cycles that the DOMM has been accessed without 8 accessing a particular node. If a node is accessed, the age of the node is reset to zero (0). Thus, once the memory manager writes the node to L1 cache in block 610, data structure memory manager updates the age of the node to zero (0), and increments the age of the remaining nodes by 1, block 612.

If, in block 608, the Index pointer did not point to a node in L1 cache, a determination is made of whether L1 cache is full, block 614. If the L1 cache is not full, data structure memory manager 218 writes the node to L1 cache, block 616. Alternatively, if L1 cache is full (614), data structure memory manager 218 identifies the least recently used node (i.e., the node with the highest age value), block 618, and determines whether the LRU node (K) is "Cdirty", block 620. A node in L1 cache is "dirty" if it has been modified by an application, but not yet written to the disk file or lower level cache where it resides. If the LRU node is not dirty (i.e., has not been updated and, therefore, a copy is saved in lower level cache or extended memory), data structure memory manager writes to L1 cache even if it means overwriting K, block 614. Alternatively, if node K is dirty, K is written to a second level (L2) cache in block 622, thereby making room for the "new" node in L1 cache and data structure memory manager writes the node to L1 cache, block 614.

Once the L1 cache has been written in block 614, the age of the nodes are updated in block 612, as described above, and the process ends.

According to one embodiment, alluded to above, the L2 cache is utilized as a write buffer for nodes in extended memory. That is, data structure memory manager 218 aggregates a plurality of WriteNode commands destined for extended memory 408 in the L2 cache until the L2 cache is full, then performs a single write of all the nodes to extended memory. An example method for writing to L2 cache 622 is presented with reference to blocks 624–632. As shown, the method begins with a determination by data structure memory manager 218 of whether the WriteNode to Index results in an L2 cache hit, i.e., is the node already in L2 cache, block 624. If so, the WriteNode command is executed and the node is written to L2 cache, block 626, and the process continues with block 616. If, in block 624, the WriteNode to Index does not result in an L2 cache hit, data structure memory manager 218 determines whether the L2 cache is full, block 628. If so, all nodes in L2 cache are written to disk files in extended memory 408, block 630. If L2 cache is not full, block 628, the WriteNode command is inserted in L2 cache, block 632, and the process continues with block 616.

ReadNode Data Structure Memory Management

Figure 7:
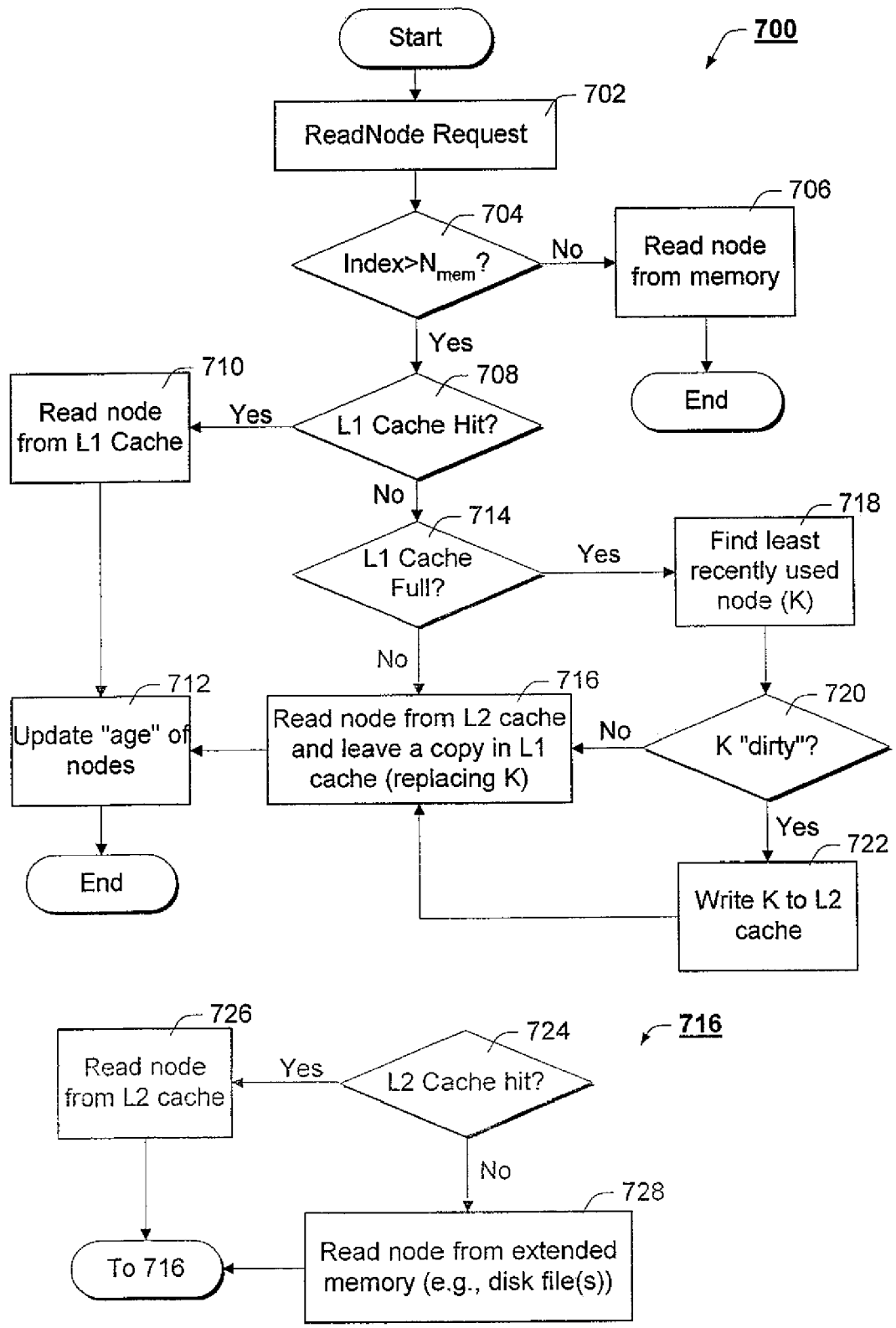
FIG. 7 is a flow chart of an example method for reading a node from the DOMM tree.

FIG. 7 is a flow chart of an example method for reading a node of the language model data structure from memory. As shown, the method begins with block 702, wherein data structure memory manager 218 receives a ReadNode command to a particular node located within memory at a position identified by Index. In block 704, data structure memory manager determines whether the requested node is located in main memory 406 or extended memory 408. More specifically, data structure memory manager 218 identifies the pointer (Index) associated with the requested node, and determines whether it points to a memory location outside of main memory 406. If the Index pointer is pointing to a location within main memory 406 (Index<=$N_{mem}$), data structure memory manager 218 executes the ReadNode command, reading the identified node from main memory 406, block 706, and the process ends.

If, in block 704, the Index pointer is pointing to extended memory, a further determination is made of whether the Index pointer points to a location within a level one (L1) cache (i.e., a L1 cache hit), block 708. If so, data structure memory manager reads the node from L1 cache, block 710. As alluded to above, data structure memory manager 218 maintains a record of activity for each of the nodes of the data structure. According to one implementation, an "age" is maintained denoting the number of cycles that the DOMM has been accessed without accessing a particular node. If a node is accessed, the age of the node is reset to zero (0). Thus, once the memory manager reads the node to L1 cache in block 710, data structure memory manager updates the age of the node to zero (0), and increments the age of the remaining nodes by 1, block 712.

If, in block 708, the Index pointer did not point to a node in L1 cache, a determination is made of whether L1 cache is full, block 714. If the L1 cache is not full, data structure memory manager 218 reads the node from L2 cache, 19 leaving a copy in L1 cache, block 716. Alternatively, if L1 cache is full (714), data structure memory manager 218 identifies the least recently used node (i.e., the node with the highest age value), block 718, and determines whether the LRU node (K) is "dirty", block 720. As described above, a node in L1 cache is "dirty" if it has been modified by an application, but not yet written to the disk file or lower level cache where it resides. If the LRU node is not dirty (i.e., has not been updated and, therefore, a copy is saved in lower level cache or extended memory), data structure memory manager reads the node from L2 cache leaving a copy in L1 cache even if it means overwriting K, block 714. Alternatively, if node K is dirty, K is written to a second level (L2) cache in block 722, thereby making room for the "new" node in L1 cache and data structure memory manager reads the node from L2 cache leaving a copy in L1 cache, block 714.

Once the ReadNode command has been executed in block 714, the age of the nodes are updated in block 712, as described above, and the process ends.

According to one embodiment, alluded to above, the L2 cache is utilized as a write buffer for nodes in extended memory. Thus, data structure memory manager 218 must be able to read a node from L2 cache or disk files of extended memory 408. An example method for reading from L2 cache 716 is provided in blocks 724-728.

As shown, the method begins with data structure memory manager determining whether the ReadNode from Index results in an L2 cache hit, block 724. If so, the node is read from L2 cache, block 726 and the process ends. Alternatively, if the ReadNode does not result in an L2 cache hit, the node is read from extended memory 408, as identified by Index, block 728.

Figure 8:
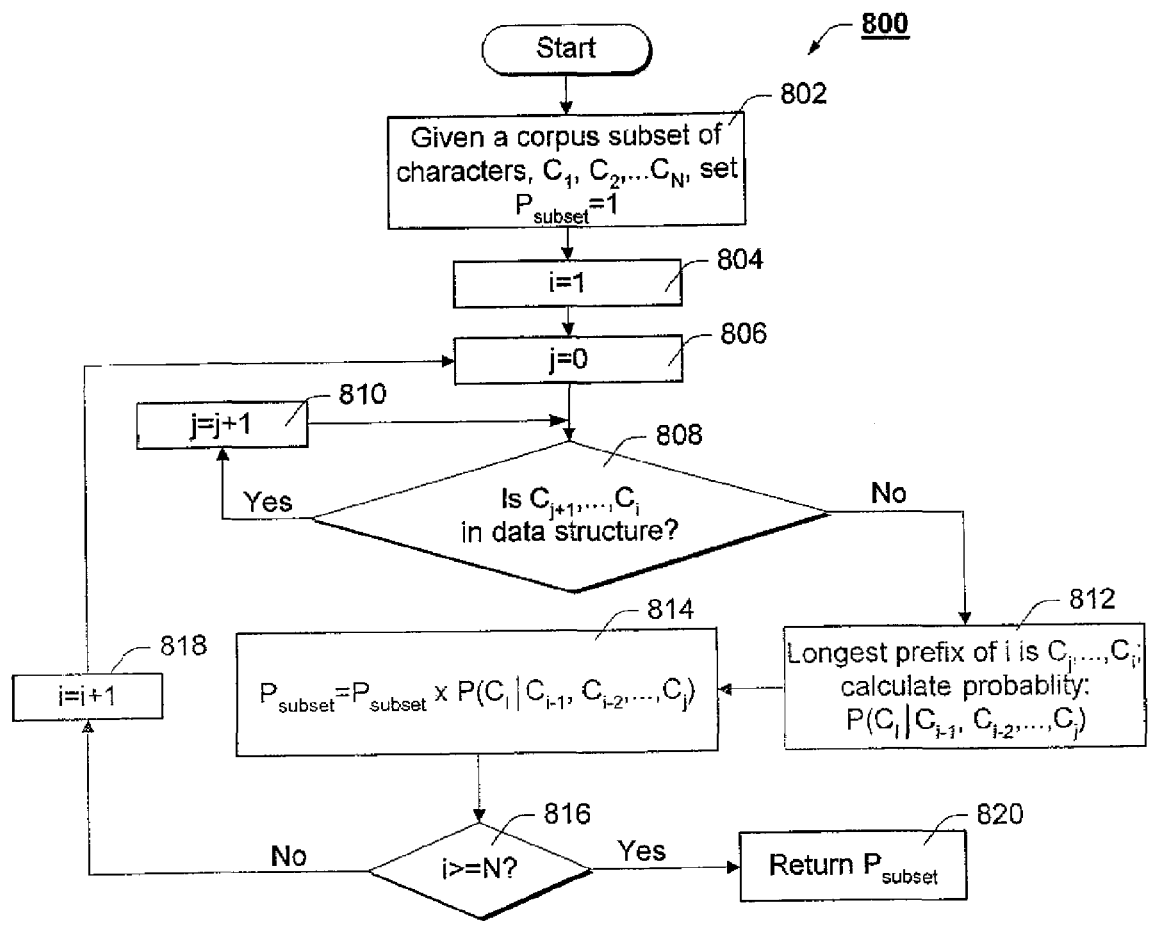
FIG. 8 is a flow chart of an example method for evaluating the probability of a textual corpus using a DOMM tree.

Having provided an example method for building, writing to and reading from a DOMM data structure with reference to FIGS. 5–7, and example method for utilizing the innovative DOMM data structure to predict the likelihood of an item string is presented with reference to FIG. 8.

Example Implementation Using a DOMM

FIG. 8 is a flow chart of an example method for predicting the probability of an item using the language model data structure of the present invention. That is, LMA 104 receives an external indication to predict the probability of a string, given an initial corpus subset of items (e.g., characters, letters, numbers, etc.). In response, controller 202 invokes an instance of Markov probability calculator, which initializes a probability measure associated with the subset to one ($P_{subset}=1$), block 802. In blocks 804 and 806, counters i and j are initiated to 1 and 0, respectively. Recall, from the discussion above, that the "j" counter represents a context, and that according to one aspect of the present invention, the statistically prediction of a character, $C_i$, is premised on a as many data points as data allows, i.e., the "dynamic order" of the Dynamic Order Markov Model.

In block 808, controller 202 via data structure memory manager determines whether $C_{j+1}, \ldots, C_i$ are located within the DOMM data structure 300. In this regard, data structure memory manager attempts to locate nodes associated with items $C_{j+1}, \ldots, C_i$ in main memory 406 and/or extended memory 408 of the stored DOMM data structure. If the item string is located within the DOMM data structure 300, then the context counter, j, is incremented by one in block 810 and the process continues with block 808 wherein data structure memory manager attempts to find this larger item string.

Once the data structure memory manager cannot locate the item string in the DOMM data structure, block 808, Markov probability calculator 212 determines that the longest prefix of i is $C_j, \ldots, C_i$, and calculates the probability of $C_i$, given the dynamically derived order (or context) of $C_{i-1}$, $C_{i-2}, \ldots, C_j$, block 812. Once the probability of the string is determined, block 812, the probability of the subset is re-calculated, block 814. More specifically, the probability of the subset is updated to reflect the new item string:

$$P_{subset}=P_{subset} \times P(C_i|C_{i-1}, C_{i-2}, \ldots, C_j) \quad (3)$$

In block 816, a determination is made of whether all of the items of the subset have been included in the probability calculation, i.e., whether i>=N, where N represents the number of items in the subset. If not, Markov probability calculator 212 moves on to the next item by incrementing "i", block 818, and resets the context count of j to 0, block 806, and the process continues with block 808. If, alternatively, all of the items (N) of the subset have been analyzed (816), then Markov probability calculator 212 returns a probability measure of the subset, block 820.

It should be appreciated, given the foregoing that the language modeling agent 104 and the DOMM data structure overcome a number of the limitations and deficiencies commonly associated with prior art language modeling techniques. First, the DOMM is novel in that it does not rely on a known lexicon or rigid segmentation algorithm. Accordingly, DOMM does not suffer from the propagation errors commonly associated with errors in lexicon or segmentation. Second, the DOMM data structure does not suffer from use of a fixed order (context) that the N-gram language model employs, (e.g., tri-gram approach). Rather, DOMM utilizes as much context as data allows, i.e., the dynamic order quality of DOMM. Further, DOMM unifies the language model and the dynamic lexicon by promoting item strings which meet a probability threshold to the dynamic lexicon.

Alternate Embodiments

Figure 9:
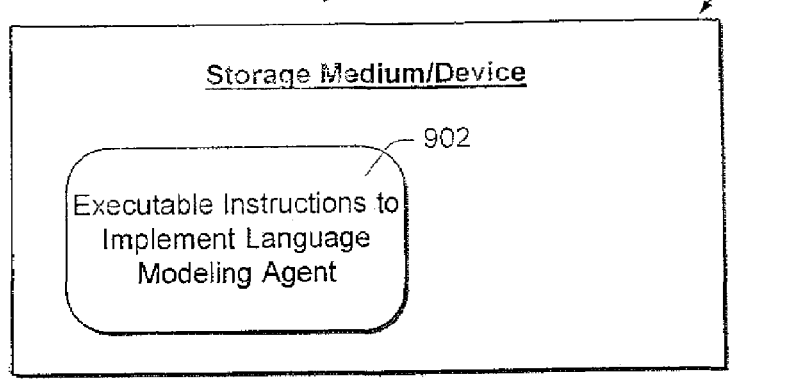
FIG. 9 is a storage medium with a plurality of executable instructions which, when executed, implement the innovative modeling agent of the present invention, according to an alternate embodiment of the present invention.

FIG. 9 is a block diagram of a storage medium having stored thereon a plurality of instructions including instructions to implement the innovative modeling agent of the present invention, according to yet another embodiment of the present invention. In general, FIG. 9 illustrates a storage medium/device 900 having stored thereon a plurality of executable instructions 902 including at least a subset of which that, when executed, implement the innovative modeling agent 116 of the present invention. When executed by a processor of a host system, the executable instructions 902 implement the modeling agent to generate a statistical language model representation of a textual corpus for use by any of a host of other applications executing on or otherwise available to the host system.

As used herein, storage medium 900 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (ML), and the like. Moreover, it is to be appreciated that the storage medium/device 900 need not be co-located with any host system. That is, storage medium/device 900 may well reside within a remote server communicatively coupled to and accessible by an executing system. Accordingly, the software implementation of FIG. 9 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. One or more computer readable media comprising computer executable instructions that, when executed, direct a computer to:
    assign each of a plurality of segments comprising a received corpus to a node in a data structure denoting dependencies between nodes;
    calculate a transitional probability between each of the nodes in the data structure; and
    manage storage of the data structure across a system memory of a computer system and an extended memory of the computer system such that at least one said node is stored in the system memory and another said node is stored in the extended memory simultaneously.

2. One or more computer readable media according to claim 1, wherein the computer executable instructions further direct the computer to:
    calculate a frequency of occurrence for each elemental item of the segment; and
    removing nodes of the data structure associated with items which do not meet a minimum threshold for the frequency of occurrence.

3. One or more computer readable media according to claim 2, wherein the frequency of the item is calculated by counting item occurrences throughout the subset and/or corpus.

4. One or more computer readable media according to claim 2, wherein the minimum threshold is three (3).

5. One or more computer readable media according to claim 1, wherein managing storage of the data structure comprises:
    identifying least recently used nodes of the data structure; and storing the least recently used nodes of the data structure in the extended memory of the computer system when the data structure is too large to store completely within the system memory.

6. One or more computer readable media according to claim 5, wherein the extended memory of the computer system comprises one or more files on an accessible mass storage device.

7. One or more computer readable media according to claim 6, wherein the data structure represents a language model, spread across one or more elements of a computing system memory subsystem.

8. One or more computer readable media according to claim 1, wherein calculating a transition probability includes calculating a Markov transitional probability between nodes.

9. A computer system comprising:
a controller; and
a memory subsystem having a system memory, an extended memory and is configured to maintain instructions that are executable by the controller to:
assign each of a plurality of segments comprising a received corpus to a node in a data structure denoting dependencies between nodes;
calculate a transitional probability between each of the nodes in the data structure; and
manage storage of the data structure across a system memory of a computer system and an extended memory of the computer system such that at least one said node is stored in the system memory and another said node is stored in the extended memory simultaneously.

10. A computer system according to claim 9, wherein the instructions further direct the controller to:
calculate a frequency of occurrence for each elemental item of the segment; and
removing nodes of the data structure associated with items which do not meet a minimum threshold for the frequency of occurrence.

11. A computer system according to claim 10, wherein the frequency of the item is calculated by counting item occurrences throughout the subset and/or corpus.

12. A computer system according to claim 10, wherein the minimum threshold is three (3).

13. A computer system according to claim 9, wherein managing storage of the data structure comprises:
identifying least recently used nodes of the data structure; and
storing the least recently used nodes of the data structure in the extended memory of the computer system when the data structure is too large to store completely within the system memory.

14. A computer system according to claim 13, wherein the extended memory of the computer system comprises one or more files on an accessible mass storage device.

15. A computer system according to claim 14, wherein the data structure represents a language model, spread across one or more elements of a computing system memory subsystem.

16. A computer system according to claim 9, wherein calculation of a transition probability includes calculating a Markov transitional probability between nodes.

17. A system comprising:
means for assigning each of a plurality of segments comprising a received corpus to a node in a data structure denoting dependencies between nodes;
means for calculating a transitional probability between each of the nodes in the data structure; and
means for managing storage of the data structure across a system memory of a computer system and an extended memory of the computer system such that at least one said node is stored in the system memory and another said node is stored in the extended memory simultaneously.

18. A system according to claim 17, wherein the managing means manages storage of the data structure by:
identifying least recently used nodes of the data structure; and
storing the least recently used nodes of the data structure in the extended memory of the computer system when the data structure is too large to store completely within the system memory.

19. A system according to claim 17, wherein the extended memory of the computer system comprises one or mote files on an accessible mass storage device.

20. A system according to claim 17, wherein the calculating means calculates a transition probability by calculating a Markov transitional probability between nodes.

* * * * *